No. 616,102. Patented Dec. 20, 1898.
P. HEESEM.
CAR FENDER.
(Application filed Feb. 17, 1897.)
(No Model.)
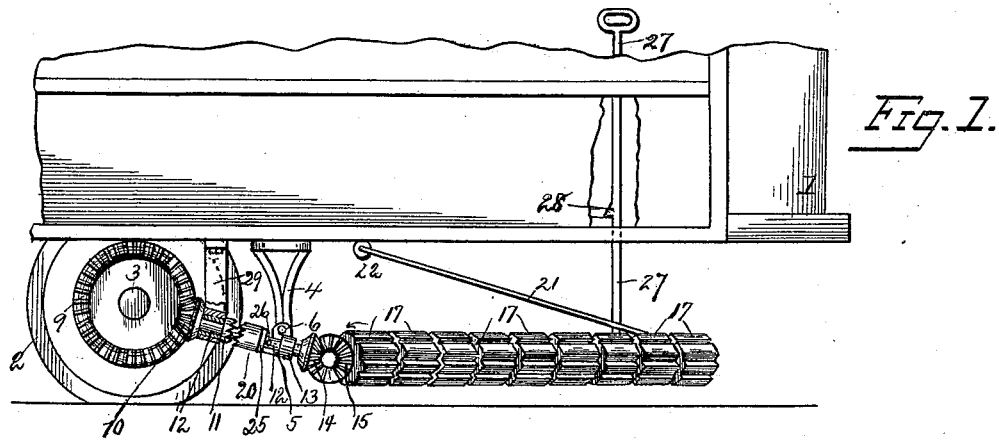
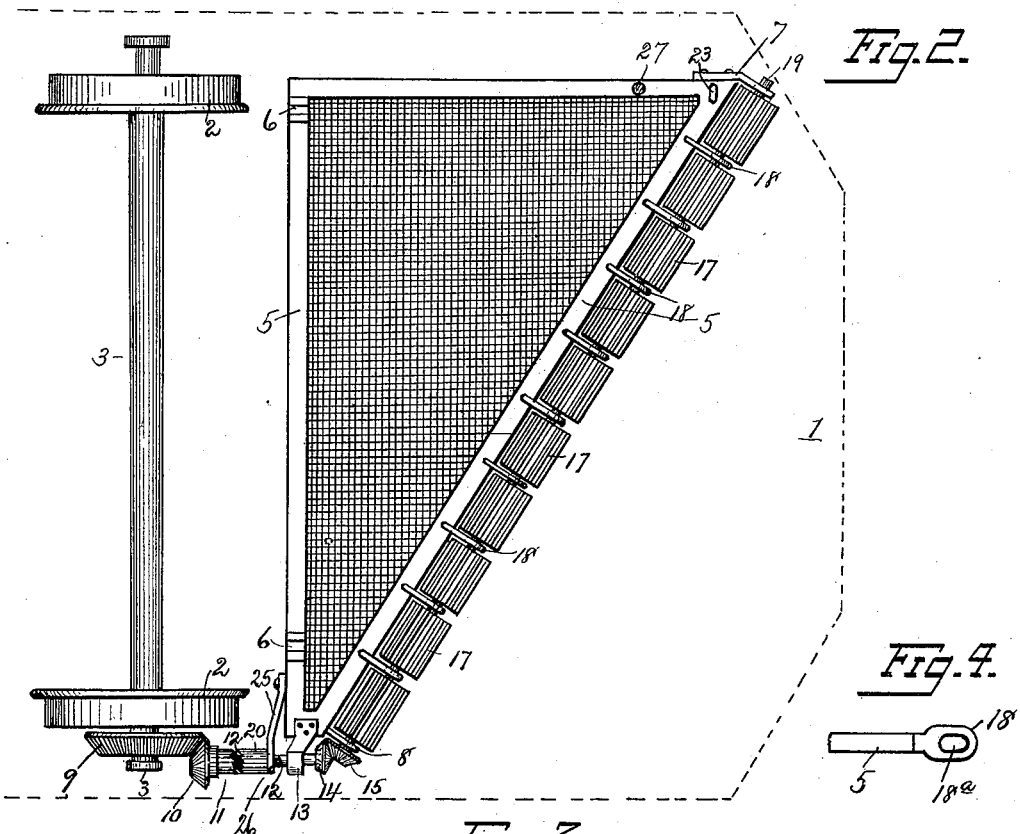
Witnesses.
Albert Popkins.
H. Joseph Doyle.
Inventor.
Peter Heesem,
By O. D. Levis.
Attorney.

UNITED STATES PATENT OFFICE.

PETER HEESEM, OF PITTSBURG, PENNSYLVANIA.

CAR-FENDER.

SPECIFICATION forming part of Letters Patent No. 616,102, dated December 20, 1898.

Application filed February 17, 1897. Serial No. 623,840. (No model.)

*To all whom it may concern:*

Be it known that I, PETER HEESEM, a citizen of the United States, residing at Pittsburg, in the county of Allegheny and State of Pennsylvania, have invented certain new and useful Improvements in Car-Fenders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in a safety-fender for street-cars.

The invention has for its objects the construction of a fender that will be simple in construction, strong, durable, comparatively inexpensive to manufacture, and above all prevent the possible injury or loss of life to the person or persons who should unfortunately come in contact with the car.

With the above objects in view the invention finally consists of the novel construction, combination, and arrangement of parts, as will be hereinafter more specifically described.

In describing the invention in detail reference is had to the accompanying drawings, forming a part of this specification, and wherein like figures of reference indicate similar parts, in which—

Figure 1 is a side view of my improved fender attached to a car. Fig. 2 is a plan view of the fender and also the forward set of car-wheels in connection therewith. Figs. 3 and 4 are details of a portion of the same.

Reference being had to the drawings, the numeral 1 designates the car-body, 2 the wheels, and 3 the axle of the same.

4 is a pair of brackets upon which is pivoted the angular fender-frame 5 by the lugs 6.

The rod 21 connects at one end to the eyebolt 22, which is attached to the under side of the car-body, and at its opposite end to the eyebolt 23 upon the outer end of the fender-frame, forming a support for that end of the frame.

Upon the upper outer corner of the fender-frame is secured the bracket 7, which forms a bearing for the end of the shaft 19, and upon the opposite end is secured the bracket 8, which also forms a bearing for the opposite end of the said shaft. The bearing-point within the said bracket is made of an oblong form, as shown at Fig. 4, so as to allow the shaft to have a slight lateral movement toward the frame, the object of which will be readily apparent after explaining the operation of the fender. Secured fast to and at intervals along the said shaft 19 are the rubber corrugated rollers 17. Secured to the fender-frame are the guards 18, which project over the shaft and between the said rubber rollers. Upon the lower end of the said shaft 19 is secured the bevel-wheel 15, and upon the one end of the shaft 12, which is supported upon the bracket 13, is a bevel-wheel 14, which is adapted to engage with the said wheel 15. The bevel pinion-wheel 10, which is supported upon a suitable bearing 29, attached to the car-body, such as shown at Fig. 1, engages with the large bevel gear-wheel 9, which is secured to the car axle or wheel, as shown, and has the clutch 11 formed thereon. An opening is formed through the said pinion 10 and answers the purpose of a bearing and at the same time allows the shaft 12 to have a lateral motion, as will afterward be understood in the operation of the fender. The clutch 20 is formed or otherwise secured to the shaft 12 and is provided with teeth similar to that of the one formed upon the pinion 10.

The shaft 19 passes through slots 18ª in the guard 18, which slots are of a size sufficient to allow the bevel-wheel at the end of said shaft to push the bevel-wheel 14 and shaft 12 inward, so that the clutches 11 and 20 will engage with each other, but will not allow shaft 19 to be pushed inward to such an extent as to cause the bevel-wheels to be thrown out of engagement.

The operation of the fender is as follows: When a person falls upon the track in front of the car, the rubber rollers 17 first strike the person, which causes the shaft upon which the said rollers are arranged to move slightly inward toward the frame, and at the same time the shaft 12, which is coupled up thereto by the bevel-gears 14 and 15, is thrust inward a sufficient distance to cause the clutch 20 to engage with the clutch 11, so that the rolls are revolved by the action of the car-wheels and gear and prevent the person from getting beneath the fender. After the pressure is removed from the rolls the spring 25 adjusts the shaft 12 back to its original position, thus uncoupling the clutches and allowing the rollers to again remain stationary.

26 indicates a pin formed upon the shaft 12 and adapted to enable the spring 25 to force the shaft 12 back to its original position.

In practice the bevel-gears 14 and 15 do not engage with each other until the rollers 17 meet with an obstruction, when they will be forced backwardly, causing gear 15 to mesh with gear 14 and the shaft 12 to be rotated through the medium of the bevel-gears 9 and 10, thereby rotating the said rollers.

Should it be found practical, the shaft having the rubber rollers thereon may be removed and a shaft having brushes thereon substituted, so that the fender may be used as a sweeper which can be easily made operative by coupling the clutches together, removing the rod 21, and attaching a rod, such as that designated as 27, to the frame and extend the same up into the car in a convenient place for the operator to lower and raise the same. The said rod 27 is provided with a lug 28, which is adapted to hold the rod in its normal position.

Having thus fully shown and described my invention, what I claim as new, and desire to secure by Letters Patent, is—

1. A car-fender comprising the frame provided at its forward portion with rollers mounted on a shaft 19, said shaft 19 being provided with a pinion at one end, in combination with a shaft provided at each end with a pinion, said shaft and pinions being adapted to be brought into engagement with the pinion on the shaft 19 and a gear-wheel on the front axle of the car, substantially as set forth.

2. A car-fender comprising the frame provided at its forward portion with rollers mounted on a shaft 19, said shaft being attached to the car by means of brackets each provided with an oblong opening a pinion on one end of said shaft 19, a shaft 12 provided at each end with pinions adapted to engage with the said pinion on shaft 19 and a beveled gear-wheel on the car-axle, and a spring-actuated clutch operating on said shaft 12, substantially as set forth.

3. A car-fender comprising the angular frame provided at its forward portion with corrugated rollers mounted on a shaft 19, the shaft being attached to the car by means of brackets each provided with an oblong opening, guards secured to the frame adapted to project over the shaft between the rollers, a pinion on one end of shaft 19, a shaft 12 provided with a spring-actuated clutch and carrying at each end thereof a pinion, said pinions being adapted to be brought into engagement with the pinion on shaft 19, and a beveled gear on the car-axle, substantially as set forth.

In testimony whereof I affix my signature in presence of two witnesses.

PETER HEESEM.

Witnesses:
JOS. R. McQUAIDE,
RICHARD S. HARRISON.